April 15, 1941.   J. W. WATSON   2,238,197
BEARING STRUCTURE
Filed Sept. 15, 1938
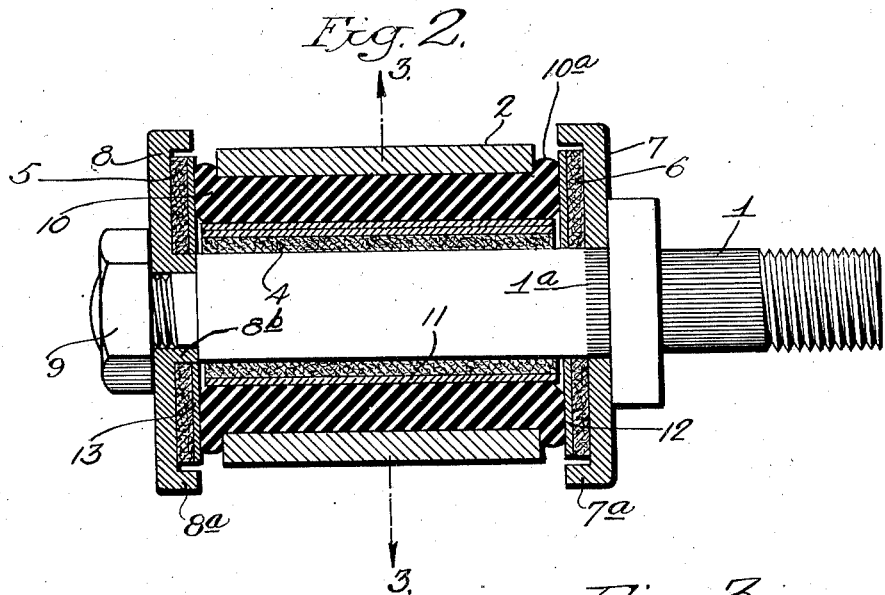
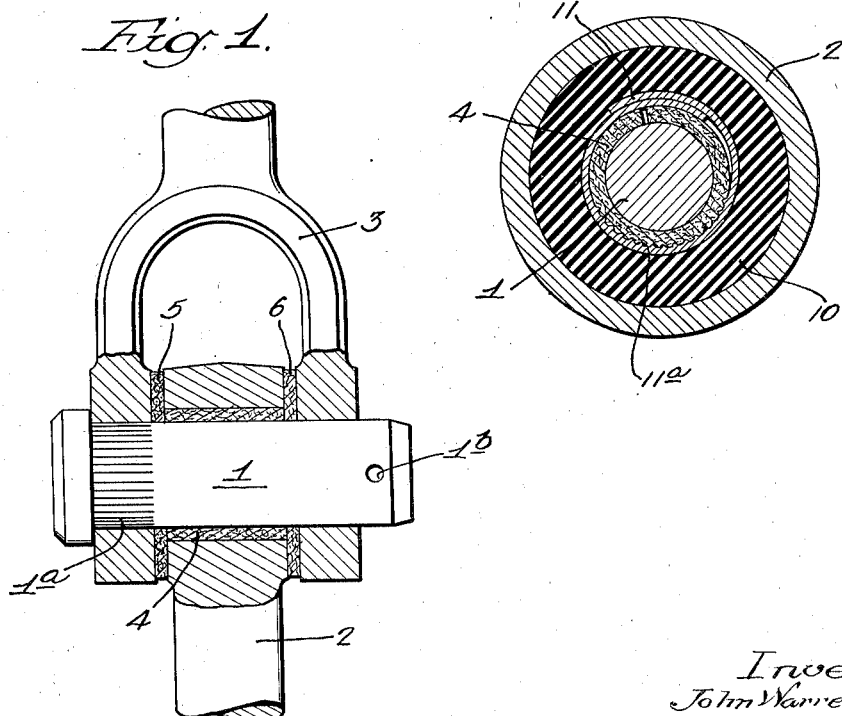
Inventor
John Warren Watson
by his Attorneys
Howson & Howson Patented Apr. 15, 1941

2,238,197

UNITED STATES PATENT OFFICE 2,238,197

BEARING STRUCTURE

John Warren Watson, Wayne, Pa., assignor to John Warren Watson Company, Philadelphia, Pa., a corporation of Pennsylvania Application September 15, 1938, Serial No. 230,155

8 Claims. (Cl. 308—26)

This invention relates to the use of paper as an agent or matrix for carrying a wear-resistant material or compound for producing inexpensive, self-lubricating bearing bushings and thrust bearing parts, and to means for protecting these fragile parts from destructive actions and conditions encountered in various applications, and also to means for avoiding destructive actions between the above mentioned protective means and the bushing and/or thrust bearing parts.

A particular object of the invention is to provide a fibrous material for bearing bushings and similar duty which may be readily impregnated with a suitable wear-resistant material or compound or which will permit of the introduction of the wear-resistant material during the fabrication of the fibrous material such, for example, as during the beater operation in the fabrication of paper.

A further object of the invention is to provide a fibrous material for bearing bushings and similar duty which when impregnated or loaded with a suitable wear-resistant material or compound will show no tendency to fray when subjected to normal loads and bearing actions.

A further object of the invention is to provide a fibrous material for bearing bushings and similar duty which when impregnated or loaded with a suitable wear-resistant material or compound will show marked ability to withstand compression and spreading under normal loads and service.

A further object of the invention is to provide, in a bearing structure, resilient buffer or cushioning means to protect the fragile bushing and/or thrust bearing parts from hammer-blow, misalignment and other destructive movements and conditions encountered in many types of application such, for example, as in shock absorber link joints, steering rod joints, spring shackles, etc.

A further and very particular object of the invention is to provide means for separating or otherwise protecting a fragile wear-subjected part from destructive "kneading" and "gnawing" actions resulting from the stretching, compression and distortion movements to which a resilient cushioning means is subjected in service, said protective means also being important to protect the resilient cushioning means from wear or tearing actions which would result from relative sliding movements between the cushioning means and a self-lubricating bushing and/or thrust bearing part.

A further object of the invention is to provide in a bearing structure means for protecting the fragile bearing parts from flying gravel and other destructive outside agencies or conditions which may be encountered in a great variety of uses.

In the construction of impregnated fibrous materials, it is difficult to maintain close tolerances in the thickness dimension. The addition, therefore, of a resilient buffer member in a bearing structure is also advantageous in compensating for the thickness variations. This compensating ability constitutes a further object of the invention.

If these buffer or cushioning members are held under a certain amount of compression, and they should be, a further object in their use is found in the fact that they will expand from this compressed position and keep the parts "snug" and free from rattles even after considerable wear may have taken place.

In Figure 1 the bearing bushing structure includes two relatively oscillatable jointed structures spaced from each other by a bushing and thrust bearing parts of paper impregnated with wear-resistant and lubricating material.

Fig. 2 shows a bearing structure incorporating, in addition to the fragile wear-subjected bushing and thrust bearing parts, a buffer or cushioning member and also protective means between the cushioning member and the bushing and thrust bearing parts.

Fig. 3 is a section on line 3—3 of Fig. 2.

Referring more particularly to Figure 1, 1 and 2, respectively, are relatively movable shaft and eye members. Shaft member 1 is held with relation to a yoke member 3 by means of serrations on the shaft member at 1a and a cotter pin, not shown, through hole 1b. 4 is a paper bushing impregnated with a suitable wear-resistant, waterproofing and lubricating compound. This bushing, for the sake of low cost is preferably cut from a sheet of the impregnated paper and rolled up into tubular form. This class of bearing bushing structure is preferably supplied also with thrust washers 5 and 6 of paper impregnated as above.

Referring more particularly to Figures 2 and 3, 1 and 2, respectively, are relatively movable shaft and eye members. 4, 5 and 6, respectively, are relatively fragile, wear-resistant and self-lubricating bushing and thrust washer parts. 7 and 8 are metal washers held with relation to shaft 1, respectively, by serrations 1a on shaft 1 and by jam nut 9. These washers 7 and 8, or other flange-like members serving similar purpose, are preferably of greater diameter than the wear-subjected thrust washers 5 and 6 for the purpose of protecting these fragile members from flying gravel, other harmful outside agents, or from rough handling. In cases where even greater protection is desired, these metal washers may be provided with inwardly turned edges 7a and 8a, respectively. Member 10 is a sleeve of cushioning material, such, for example, as soft rubber which is designed to fit snugly and adhere firmly to eye member 2, this snug and firm adherence fit, in this instance, being obtained by end pressure against the rubber supplied by the drawing together of washers 7 and 8 by means of jam nut 9. This sleeve member may be provided with a radial extending collar 10a at one of its ends for the purpose of centering it in correct longitudinal relation with eye member 2. The axially extending shoulder at the other end is caused by the longitudinal pressure against the sleeve produced by jam nut 9. The inner edges of sleeve member 10 are preferably chamfered to prevent the soft rubber from flowing down, under pressure, between the bushing and thrust washer parts. 11 is a contractible protective member rolled up out of sheet metal or other non-elastic, flexible material possessing sufficient section and strength to protect members 4 and 10, each, from relative movements and destructive actions by the other. Washer members 12 and 13 are of sheet metal or other suitable non-elastic material likewise having sufficient section and strength to protect thrust washers 5 and 6 from relative movements and destructive actions of sleeve member 10, and vice versa. In the form of the invention shown in Figures 2 and 3, it will be seen that hammer-blows and misalignments between members 1 and 2 are prevented from being transmitted, destructively, to the relatively fragile bushing and thrust washer members, or any of them. The purpose of the inner flange 8b on washer 8 is for the concentric holding of washers 5 and 13 during assembly. If desired, protective members 11, 12 and 13, or any of them, may be provided, as indicated in the drawing by the jagged line 11a, with a plurality of minute punched-out, prong-shaped projections or other means suitable to cause them to firmly adhere to the fibrous parts and thus insure that whatever movements take place against the fibrous parts, shall take place between them and parts 1, 7 and 8. Provision for such adherence is particularly advisable between bushing member 4 and the protective overlapping member 11 to prevent possible gouging of the former by the sharp edge of the inner lap of the latter, or if desired, this edge may be turned back on itself.

In most cases, the relatively movable bearing parts would be made of steel, the surface or surfaces in rubbing contact with the bushing and/or thrust bearings preferably being chromium or otherwise plated to lessen abrasion and wear of the coacting bushing and/or thrust bearing parts.

The wear-resistant impregnating material would be compounded variously from suitable natural or synthetic waxes such, for example, as those disclosed in my copending application Serial Number 230,156 filed September 15, 1938, or other suitable wear-resistant material or compound according to the requirements of any particular duty with regard to lubricating properties, coefficient of friction, degree of balance between static and dynamic coefficient of friction, melting point, toughness, hardness, waterproofing, etc.

A paper which has been found to be highly suitable for the duty herewith is one incorporating a small percentage of kapok fibres as made by the Seaman Paper Company.

As a wear-resistant material which may be introduced with the pulp in the beater operation in the making of paper, for example, rubber latex has been found to be very satisfactory, particularly for those bushing duties where relatively high coefficient of friction and good damping action is required, such, for example, as in spring shackle bushings. A paper of this nature is manufactured by the Latex Fibre Industries, Inc. The frictional action of the latex loaded paper is very smooth, in other words, there is good balance between the static and dynamic coefficients.

The axial pressure against the cushioning sleeve 10 which causes it to adhere firmly to eye 2 also causes it to adhere firmly to the metallic protective members 11, 12 and 13.

The protective means between the cushioning member and the bushing and/or thrust bearing parts, instead of being of sheet metal construction as shown in the drawing, might, if desired, be in the form of a non-elastic coating, such, for example, as metal spray, a tough lacquer compound or other applicable material, applied directly to the back of the wear-subjected parts or to the contacting surface of the cushioning member, or to both.

In the form of bearing bushing structure shown in Figures 2 and 3, it will be noted that, because of the self-lubricating bushing and thrust bearing members, free relative rotation of the relatively movable bearing parts is permitted, and, because of the resilient cushioning means between said relatively movable bearing parts, substantial eccentric, endwise and misalignment movements between them are readily permitted, while these movements, in excess, are prevented. Also it will be noted that the parts are protected from destructive actions of each other and from destructive actions of outside agents. Thus is disclosed a bearing or joint structure providing complete universal action and one which is sufficiently protected for most applications.

Having thus described my invention, I claim:

1. A bushing structure comprising a fibrous member incorporating latex-deposited rubber.

2. A bushing structure comprising a paper member incorporating latex-deposited rubber.

3. In a bushing structure, the combination of a fibrous member incorporating latex-deposited rubber, and a supporting buffer member of resilient material.

4. In a bushing structure, the combination of a paper member incorporating latex-deposited rubber, and a supporting buffer member of resilient material.

5. In a bearing-bushing structure, the combination of two relatively rotatable structures spaced from each other both radially and axially by cushioning means and by lubricant-impregnated bearing means, said cushioning means and said lubricant-impregnated bearing means being spaced from each other by means for protecting one of said first-mentioned means from destructive actions of the other of said first-mentioned means.

6. In a bearing bushing structure, the combination of two relatively rotatable structures spaced from each other both radially and axially by cushioning means and by dry lubricant-impregnated bearing means, said cushioning means and said dry lubricant-impregnated bearing means being spaced from each other by means for protecting one of said first-mentioned means from destructive actions of the other of said first-mentioned means.

7. As a bearing structure for the elimination of stick at the start of movements between two relatively movable members, a fibrous member incorporating latex-deposited rubber.

8. In a bearing bushing structure, the combination of two relatively rotatable structures spaced from each other both radially and axially by cushioning means and by lubricant-impregnated bearing means, said axial cushioning means and said axial lubricant-impregnated bearing means being spaced from each other by means for protecting one of said axial means from destructive actions of the other of said axial means.

JOHN WARREN WATSON.